(12) United States Patent
Araki et al.

(10) Patent No.: US 7,057,322 B2
(45) Date of Patent: Jun. 6, 2006

(54) ROTOR FOR RELUCTANCE TYPE ROTATING MACHINE

(75) Inventors: Takashi Araki, Yokkaichi (JP); Masakatsu Matsubara, Mie-gun (JP); Motoyasu Mochizuki, Ama-gun (JP); Yukihiko Kazao, Yokohama (JP); Masanori Arata, Yokohama (JP); Yasuo Hirano, Kuwana (JP); Nobutake Aikura, Yokkaichi (JP); Akito Kondo, Inabe-gun (JP); Masahiko Yamashiki, Tsu (JP); Masanori Ohashi, Fuchu (JP); Takashi Hanai, Nagoya (JP); Ken Takeda, Anjo (JP); Hiroshi Morohashi, Anjo (JP)

(73) Assignees: Kabushiki Kaisha Toshiba, Tokyo (JP); Aishin AW Co., Ltd., Anjo (JP); Toshiba Industrial Products Manufacturing Corporation, Mie-gun (JP)

( * ) Notice: Subject to any disclaimer, the term of this patent is extended or adjusted under 35 U.S.C. 154(b) by 0 days.

(21) Appl. No.: 10/897,009

(22) Filed: Jul. 23, 2004

(65) Prior Publication Data
US 2005/0104468 A1 May 19, 2005

(30) Foreign Application Priority Data
Jul. 31, 2003 (JP) .............................. 2003-204864

(51) Int. Cl.
*H02K 1/27* (2006.01)
*H02K 21/14* (2006.01)
(52) U.S. Cl. ............................. 310/156.53; 310/156.09
(58) Field of Classification Search ................ 310/112, 310/114, 216–218, 156.47, 156.53, 156.56, 310/156.09, 156.57
See application file for complete search history.

(56) References Cited

U.S. PATENT DOCUMENTS

| | | | | |
|---|---|---|---|---|
| 4,739,201 A | * | 4/1988 | Brigham et al. | 310/49 R |
| 4,841,186 A | * | 6/1989 | Feigel et al. | 310/156.12 |
| 5,355,044 A | * | 10/1994 | Uchida et al. | 310/162 |
| 5,397,951 A | * | 3/1995 | Uchida et al. | 310/156.21 |
| 5,760,520 A | * | 6/1998 | Hasebe et al. | 310/261 |

(Continued)

FOREIGN PATENT DOCUMENTS

JP 2003-032930 * 1/2003

Primary Examiner—Burton Mullins
(74) Attorney, Agent, or Firm—Oblon, Spivak, McClelland, Maier & Neustadt, P.C.

(57) ABSTRACT

A rotor for a reluctance type rotating machine includes a rotor core formed by stacking a number of annular core materials each of which includes magnetic concave and convex portions alternately formed on an outer circumference thereof and a central through hole, the rotor core having a key axially extending on an outer circumference, the rotor core being divided into a plurality of blocks, the core materials constituting one of at least three blocks having the magnetic concave and convex portions shifted by a predetermined angle in one of a rotating direction of the rotor and a direction opposite the rotating direction of the rotor relative to a center line passing the key, the core materials constituting each one of the blocks located at both ends of the one block having the magnetic concave and convex portions shifted by a predetermined angle in the other of the rotating direction of the rotor and the direction opposite the rotating direction of the rotor relative to a center line passing the key, and a rotational shaft inserted through the central hole of the rotor core, the shaft having a key groove engaging the key of the rotor core.

2 Claims, 6 Drawing Sheets

U.S. PATENT DOCUMENTS

| | | | |
|---|---|---|---|
| 6,252,323 B1 * | 6/2001 | Nishikawa et al. | 310/156.01 |
| 6,867,524 B1 * | 3/2005 | Liang | 310/156.47 |
| 6,876,115 B1 * | 4/2005 | Takahashi et al. | 310/156.47 |
| 2002/0175585 A1 * | 11/2002 | Tagome et al. | 310/156.56 |

* cited by examiner

ROTOR FOR RELUCTANCE TYPE ROTATING MACHINE

BACKGROUND OF THE INVENTION

1. Field of the Invention

This invention relates to a rotor for a reluctance type electric rotating machine which can achieve the similar effects to those achieved by skew.

2. Description of the Related Art

A reluctance type rotating machine or, for example, a reluctance type rotating machine provided with permanent magnets includes a rotor formed with a magnetic convex portion where a flux is easy to pass (d axis) and a magnetic concave portion where a flux is difficult to pass (q axis) and a permanent magnet which is disposed in a stator provided with a stator winding. The magnetic convex portion (d axis) has a high magnetic flux density in an air gap, whereas the magnetic concave portion (q axis) has a low magnetic flux density in an air gap. These variations in the magnetic flux density produce reluctance torque. Furthermore, torque is also developed by a magnetic attractive force and a magnetic repulsive force between poles of the permanent magnet and stator.

Figure 7:
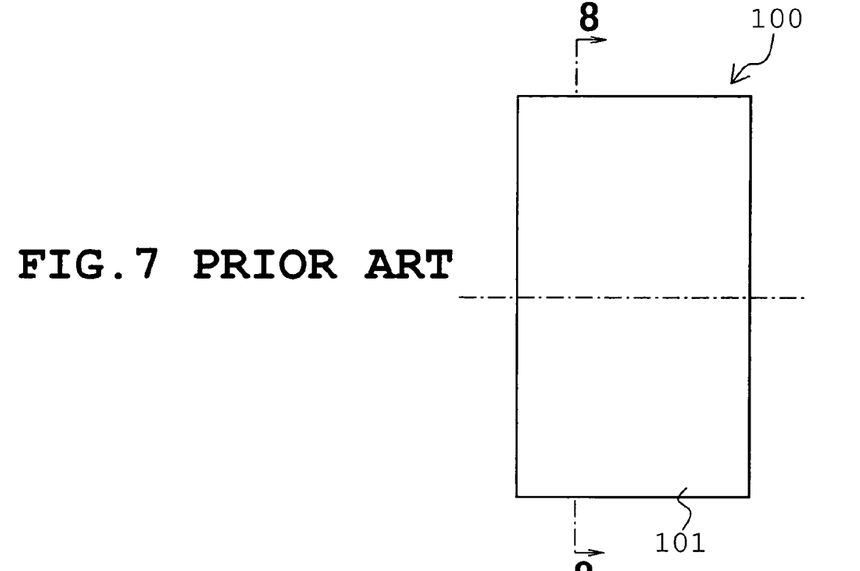
FIG. 7 is a side view of a conventional rotor.
Figure 8:
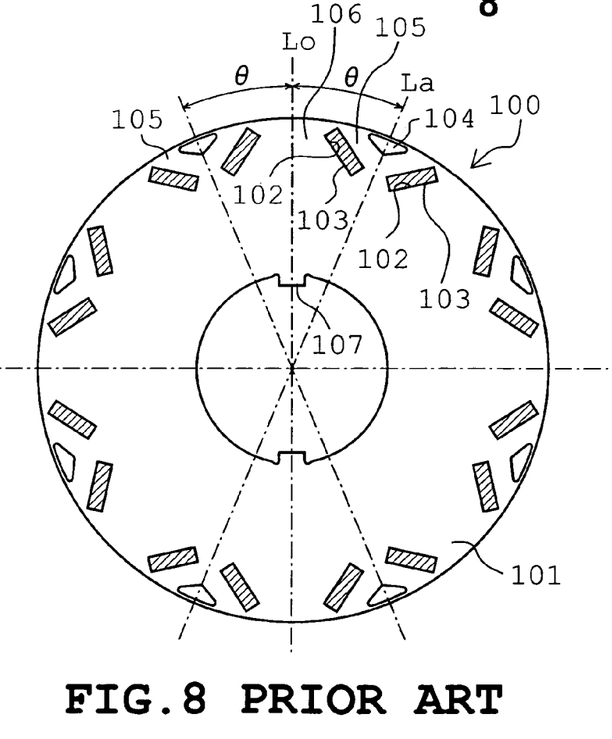
FIG. 8 is a sectional view taken along line 8—8 in FIG. 7.

FIGS. 7 and 8 illustrate an example of conventional rotor for a reluctance type rotating machine with permanent magnets. The illustrated machine is an 8-pole machine. FIG. 7 is a side view of the rotor with an end plate and a rotational shaft being eliminated. FIG. 8 is a sectional view taken along line 8—8 in FIG. 7. Referring to FIG. 7, the rotor 100 includes a rotor core 101 made by stacking a number of annular silicon steel sheets. The rotor core 101 has pairs of generally rectangular magnet insertion holes 102 formed in an outer circumference thereof as shown in FIG. 8. Permanent magnets 103 are inserted and fixed in the insertion holes 102 respectively. The outer circumference of the rotor core 101 is further formed with cavities 104 located between the respective pairs of permanent magnets 103 as shown in FIG. 8. Each cavity 104 is formed into a generally triangular shape. In the rotor 100, each pair of insertion holes 102, permanent magnets 103 and each cavity 104 constitute the aforesaid magnetic concave portion 105 where a flux is difficult to pass (q axis). Each portion between the concave portions 105 constitutes the aforesaid magnetic convex portion 106 where a flux is easy to pass (d axis). The magnetic concave and convex portions 105 and 106 are formed alternately with a predetermined angle therebetween. See JP-A-2000-339922, for example.

The rotor core 101 has keys 107 formed on an inner circumference thereof. The keys 107 are adapted to engage key grooves of a rotational shaft respectively. Furthermore, a center line Lo passing the keys 107 is adapted to pass the center of the magnetic convex portion 106. A center line La passes the center of the magnetic convex portion 105 adjacent to the center line Lo. The center line Lo is adapted to meet the center line La at an angle θ. The angle θ is at 22.5 degrees when the rotor 100 has 8 poles. The rotor 100 is adapted to be disposed in a stator (not shown) provided with a stator winding.

It is well known that squirrel-cage induction motors result in crawling due to torque developed by high harmonics. There is a possibility that permanent-magnet reluctance type rotating machines as the reluctance type rotating machine may cause the similar crawling to that caused by the squirrel-cage induction motors. As a result, the crawling results in torque ripple, oscillation, vibration and noise.

SUMMARY OF THE INVENTION

Therefore, an object of the present invention is to provide a rotor for a reluctance type rotating machine which can achieve the similar effects to those achieved by skew and reduce torque ripple, oscillation, vibration and noise.

The present invention provides a rotor for a reluctance type rotating machine comprising a rotor core formed by stacking a number of annular core materials each of which includes a pair of permanent magnets embedded in a portion corresponding to each magnetic concave portion, and a cavity defined between the paired permanent magnets so that magnetic concave and convex portions are alternately formed on an outer circumference thereof and a central through hole, the rotor core having a plurality of keys axially extending on an inner circumference thereof, the rotor core being divided into a plurality of blocks having the same shape, and a rotational shaft having a plurality of key grooves formed in an outer circumference thereof and engaging the keys of the rotor core respectively, the shaft being inserted through the central hole of the rotor core, whereby at least three of the blocks are axially stacked so that a skew angle is made between each one of said at least three blocks and another of said at least three blocks according to the predetermined angle Δθ.

In the above-described construction, a center line passing the center of the magnetic concave portion of at least one block has a locus shifted from those of the blocks located at both ends of said one block. Consequently, since the similar effects to those achieved by skew can be achieved, the torque ripple, oscillation, vibration and noise can be reduced.

Each block may include the magnetic concave portions each of which is provided with a pair of magnet insertion holes which are opposed to each other so that a distance therebetween is gradually increased as the insertion holes near the outer circumference of the rotor, each cavity is positioned between the paired magnet insertion holes, and permanent magnets may be inserted and fixed in the insertion holes respectively.

A magnetic torque by the permanent magnets can also be achieved in addition to reluctance torque. Furthermore, harmonic values of counter electromotive force can be reduced by the similar effects to those achieved by skew.

BRIEF DESCRIPTION OF THE DRAWINGS

Other objects, features and advantages of the present invention will become clear upon reviewing the following description of the embodiments made with reference to the accompanying drawings, in which.

DETAILED DESCRIPTION OF THE INVENTION

Figure 1:
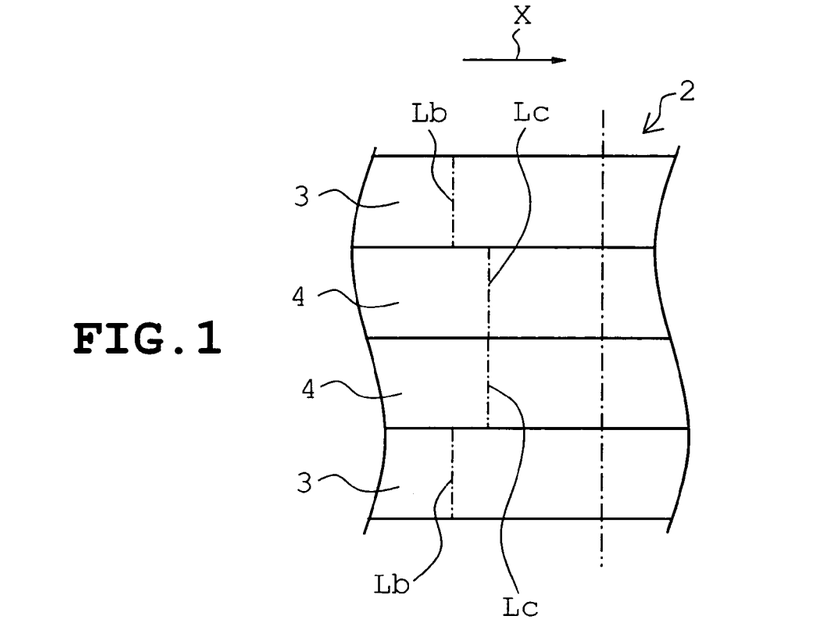
FIG. 1 is a top view of the rotor in a reluctance type rotating machine in accordance with one embodiment of the present invention.
Figure 2:
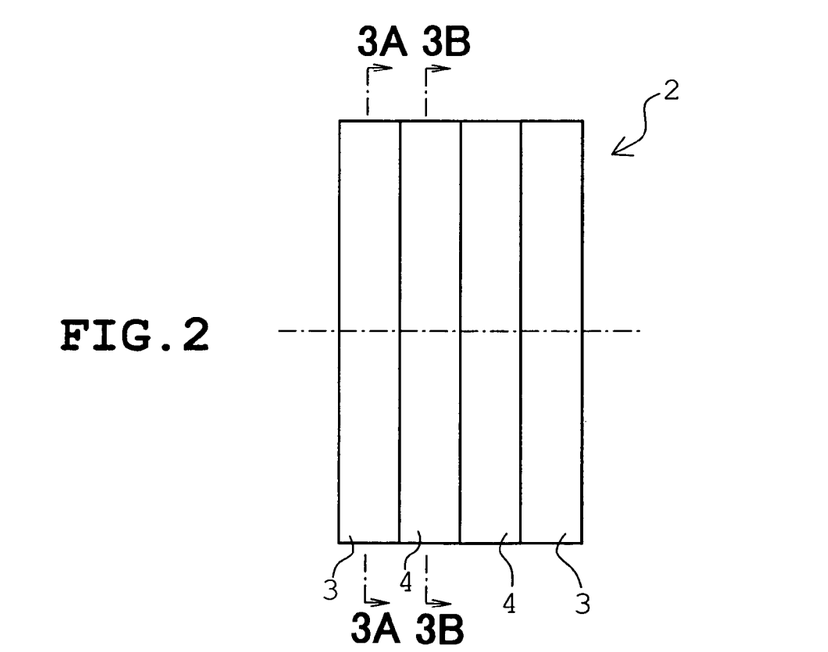
FIG. 2 is a side view of the rotor core of the rotor.

FIGS. 1 to 5 illustrate an embodiment in which the invention is applied to a reluctance type rotating machine with permanent magnets. The reluctance type rotating machine possesses eight poles. A rotor 1 of the reluctance type rotating machine includes a rotor core 2 made by stacking a number of annular silicon steel sheets serving as a core material. The rotor core 2 is divided into four blocks 3 and 4 having the same thickness as shown in FIG. 2. The blocks 3 and 4 are stacked in order of 3, 4, 4 and 3.

Each block 3 or the silicon steel sheets composing each block 3 will be described with reference to FIG. 3A. Each block 3 has a number of pairs of generally rectangular magnet insertion holes 5 formed in an outer circumferential portion thereof. The paired magnet insertion holes 5 are opposed to each other so that a distance therebetween is gradually increased as the magnet insertion holes 5 near an outer circumferential edge. Permanent magnets 6 are inserted into the paired magnet insertion holes 5 respectively and fixed by an adhesive agent, filler or the like. The outer circumferential portion of each block 3 also has cavities 7 formed between the permanent magnets 6 of each pair. Each cavity 7 is formed into a generally triangular shape having two sides parallel to the paired permanent magnets 6 and the other side extending along the outer circumference. The two sides of each cavity 7 may or may not be parallel to the paired permanent magnets 6.

Each block 3 includes each portion thereof corresponding to the paired magnet insertion holes 5, permanent magnets 6 and cavity 7 and serving as a magnetic concave portion 8 (q axis) where a flux is difficult to pass. Each block 3 further includes each portion thereof located between the magnetic concave portion 8 and serving as a magnetic convex portion 9 (d axis) where a flux is easy to pass. The magnetic concave and convex portions 8 and 9 are formed alternately so that each of the magnetic concave and convex portions 8 and 9 meets the other at a predetermined angle. Each block 3 further has two keys 10 and 11 which are formed on the inner circumference thereof so as to be 180-degree apart from each other and so as to extend axially.

A center line Lo passing the centers of the keys 10 and 11 also passes the magnetic convex portions 9 in each block 3. Now, assume a center line Loa shifted from the center line Lo by a predetermined angle $\Delta\theta$ in the direction opposite the direction of rotation of the rotor (clockwise). The center line Loa forms a predetermined angle $\theta$ with a center line Lb passing the center of the magnetic concave portion 8 adjacent to the center line Loa. Accordingly, the center line Loa passes through the center of each cavity 7 which is the center of the magnetic convex portion 9. The angle $\theta$ is represented as 180/n when n is the number of poles of the rotor 1. Furthermore, when a stator 50 (see FIG. 5) has slots the number of which is represented as 6×n, the magnetic concave and convex portions 8 and 9 representative of a pole position of each block 3 are shifted by the slot pitch a relative to the center line Lo. Accordingly, the angle $\Delta\theta$ is obtained from:

$$\Delta\theta=(360\times a)/(6\times n)=(60\times a)/n$$

Thus, the angle $\Delta\theta$ is represented as $-(60\times a)/n$ in degree. The minus sign indicates shift in the direction opposite the direction of rotation of the rotor (clockwise).

Each block 4 or the silicon steel sheets composing each block 4 will be described with reference to FIG. 3B. Each block 4 has magnet insertion holes 12 which are similar to the magnet insertion holes 5 and formed in an outer circumferential portion thereof. Permanent magnets 13 are inserted into the paired magnet insertion holes 12 respectively and fixed by an adhesive agent, filler or the like. The outer circumferential portion of each block 4 also has cavities 14 which are similar to the cavities 7 and are formed between the permanent magnets 13 of each pair.

Each block 4 includes each portion thereof corresponding to the paired magnet insertion holes 12, permanent magnets 13 and cavity 14 and serving as a magnetic concave portion 15 (q axis) where a flux is difficult to pass. Each block 4 further includes each portion thereof located between the magnetic concave portion 15 and serving as a magnetic convex portion 16 (d axis) where a flux is easy to pass. The magnetic concave and convex portions 8 and 9 are formed alternately so that each of the magnetic concave and convex portions 8 and 9 meets the other at a predetermined angle. Each block 4 further has two keys 10 and 11 which are formed on the inner circumference thereof so as to be 180-degree apart from each other and so as to extend axially.

A center line Lo passing the centers of the keys 10 and 11 also passes the magnetic convex portions 16 in each block 4. Now, assume a center line Lob shifted from the center line Lo by a predetermined angle $\Delta\theta$ in the rotation direction X of the rotor (counterclockwise). The center line Lob forms a predetermined angle $\theta$ with a center line Lc passing the center of the magnetic concave portion 15 adjacent to the center line Lob. Accordingly, the center line Lob passes the center of the magnetic convex portion 16. The angle $\theta$ is represented as 180/n when n is the number of poles of the rotor 1. The angle $\Delta\theta$ is represented as $+(60\times a)/n$ in degree. The plus sign indicates deviation in the rotation direction X of the rotor (counterclockwise).

Figure 3A:
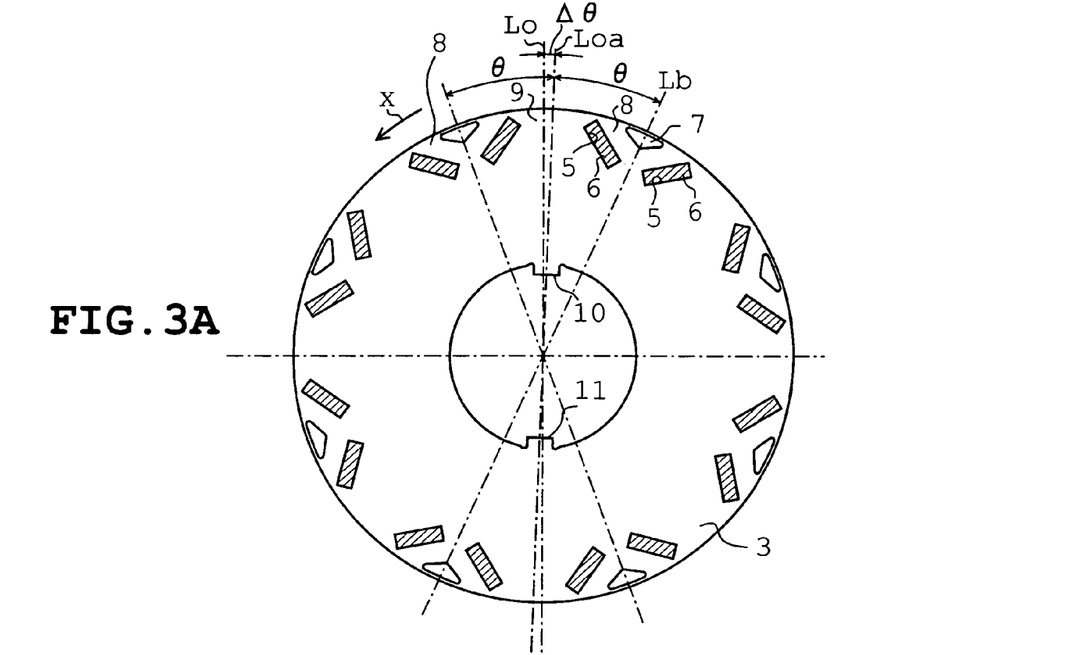
FIGS. 3A and 3B are sectional views taken along lines 3A—3A and 3B—3B in FIG. 2, showing the rotor in accordance with the first embodiment of the present invention.
Figure 3B:
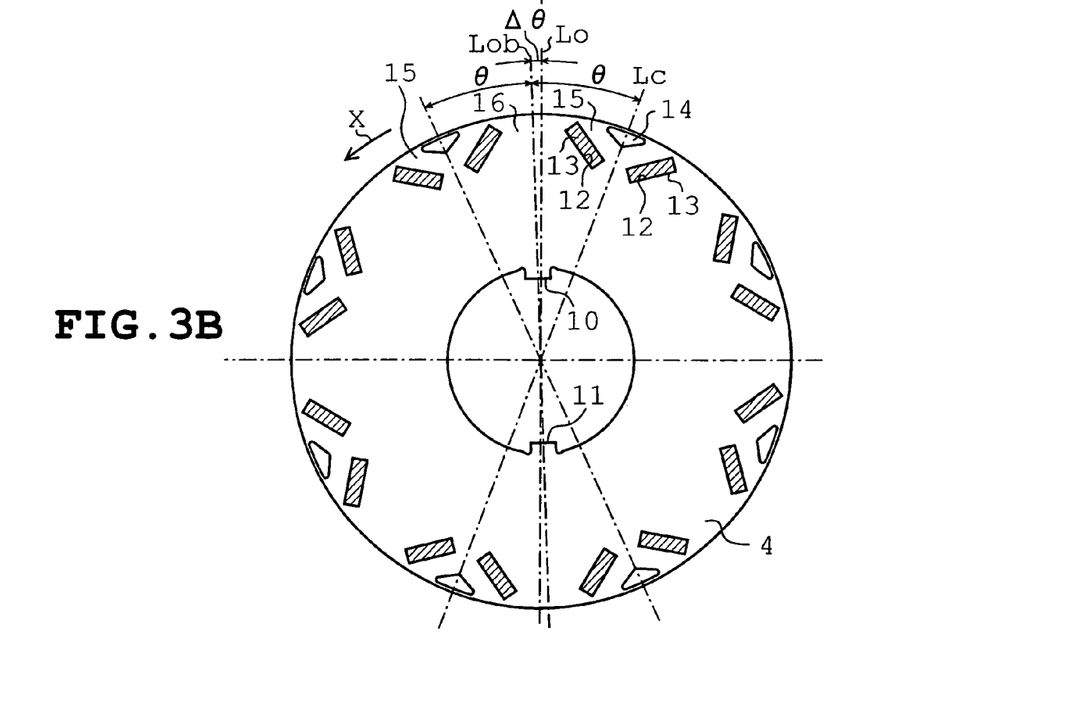
Figure 4:
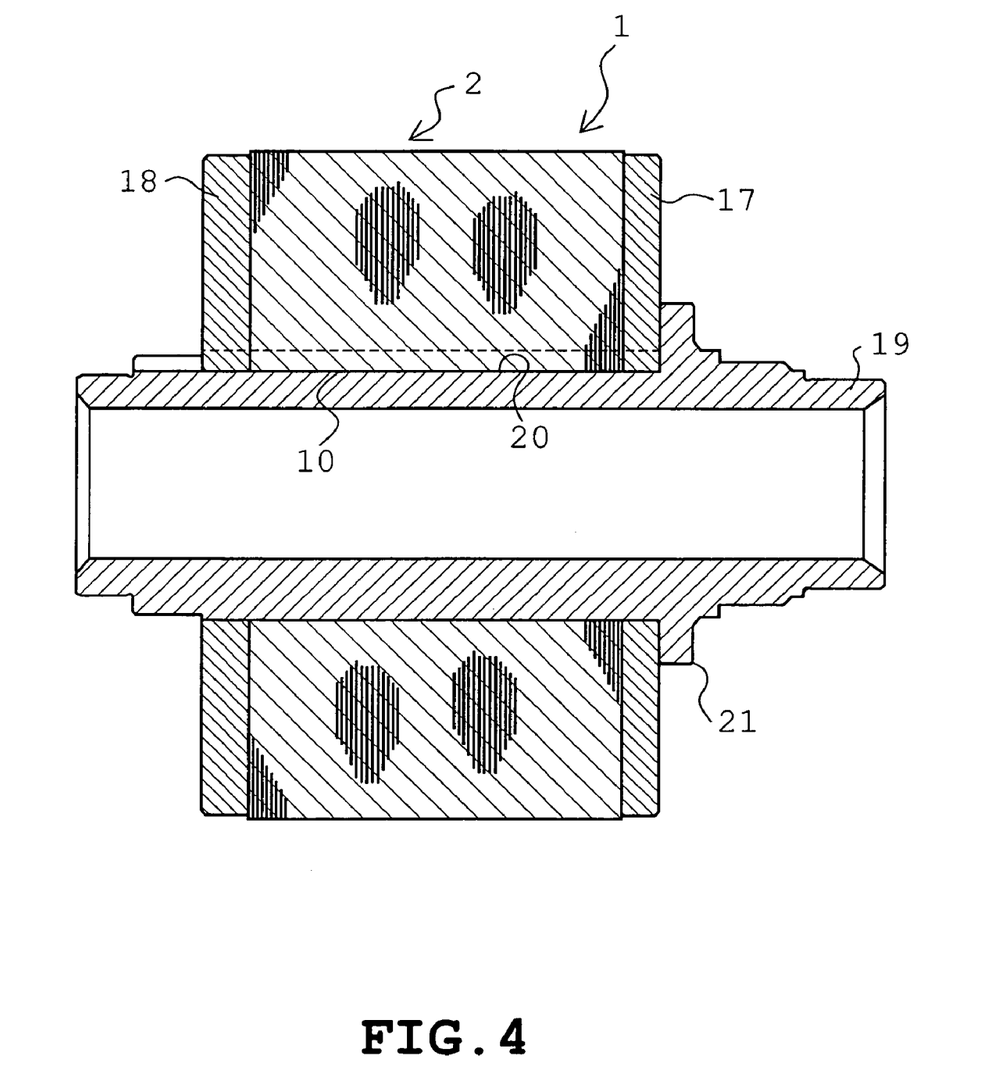
FIG. 4 is a longitudinal section of the rotor.

As obvious from FIGS. 3A and 3B, the block 4 is made by stacking the silicon steel sheets which are the same as those of the block 3 and reversed inside out. Accordingly, the blocks 3 and 4 of the rotor core 2 can be composed of a single type of silicon steel sheets. Two annular end plates 17 and 18 are attached to both ends of the rotor core 2 respectively as shown in FIG. 4.

The rotating shaft 19, rotor core 2 and end plates 17 and 18 are integrated together by shrinkage fitting thereby to be assembled. In this case, as shown in FIG. 4, the keys 10 and 11 of the rotor core 2 are adapted to correspond with key grooves 20 of the rotating shaft 19 respectively. Only one of the key grooves 20 is shown in FIG. 4. The rotating shaft 19 is formed with a flange 21 for positioning the rotor core 2 and end plates 17 and 18.

Upon completion of assembly of the rotor 1, the magnetic concave and convex portions 8 and 9 of the block 3 are shifted by the predetermined angle $\Delta\theta$ in the direction opposite the rotation direction X (clockwise) on the basis of the center line Lo. Further, the magnetic concave and convex portions 15 and 16 of the block 4 are also shifted by the predetermined angle $\Delta\theta$ in the rotation direction X (counterclockwise) on the basis of the center line Lo as shown in FIG. 1. As a result, the center lines Lb, Lc, Lc and Lb of the respective blocks 3, 4, 4 and 3 have linear loci which are zigzagged but not straightforward as in the conventional reluctance type rotating machines, as shown in FIG. 1. Accordingly, the rotor 1 can achieve the effects similar to those of skew in the rotors for squirrel-cage induction motors. In this case, an amount of shift is required to be ±0 between the center lines Lb and the center lines Lc. More specifically, the sum total of a shift angle $\Delta\theta$ (−) of the center lines Lb and a shift angle $\Delta\theta$ (+) of the center lines Lc is required to be ±0 and the sum total of loci lengths of the center lines Lb (total thickness of the block 3) is required to be equal to the sum total of loci lengths of the center lines Lc (total thickness of the block 4) or the difference between both sums is required to be ±0.

Figure 5:
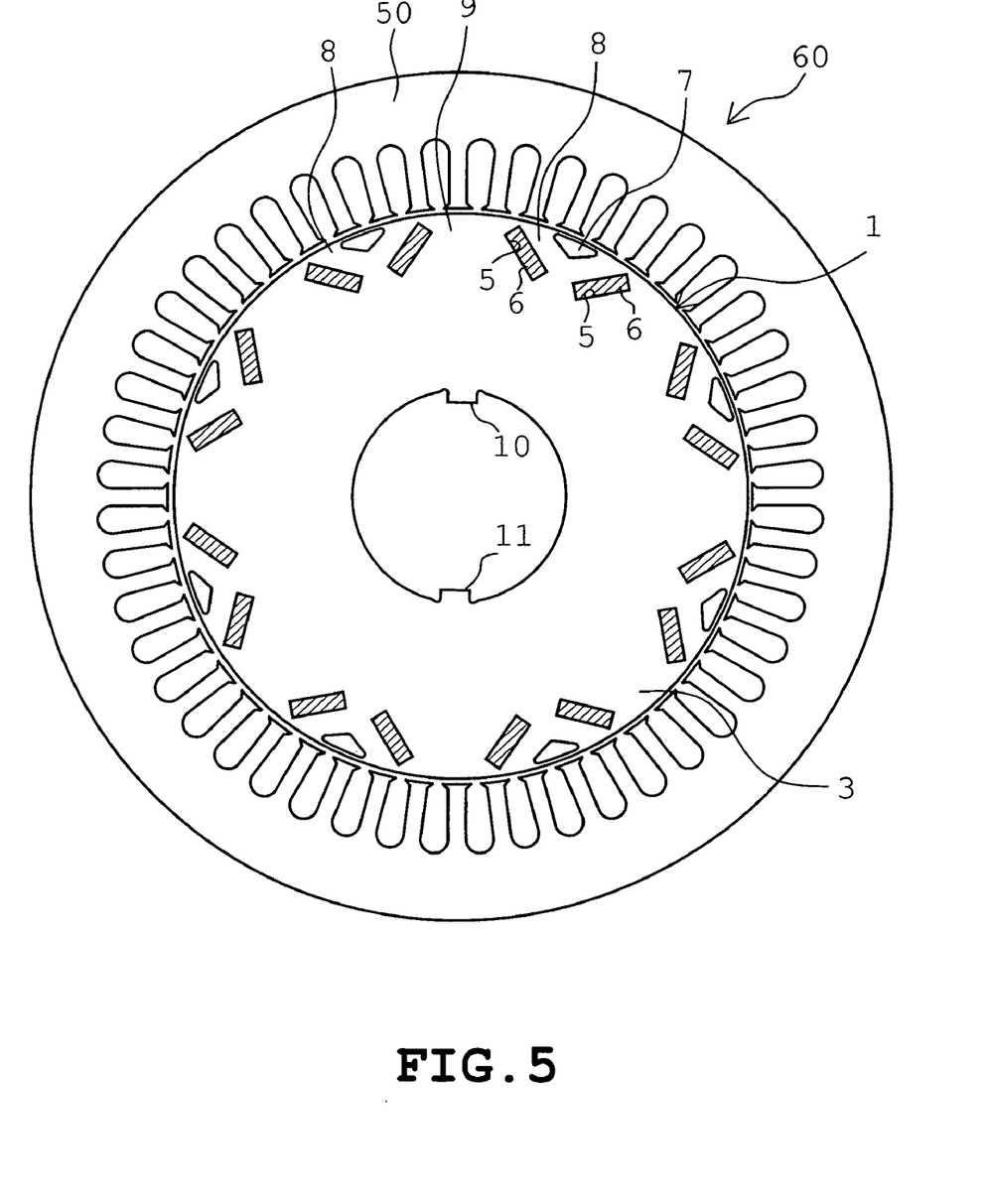
FIG. 5 is a sectional view of the reluctance type rotating machine with permanent magnets.

The permanent-magnet reluctance type rotating machine 60 comprises the rotor 1 disposed in the stator provided with stator winding (not shown) as shown in FIG. 5. The rotor 1 includes the magnetic concave portions 8 and 15 (q axis) where a flux is difficult to pass and the magnetic convex portions 9 and 16 (d axis) where a flux is easy to pass. By causing electric current to flow into the stator winding, magnetic energy is stored in air gaps over the magnetic concave and convex portions 8 and 15, and 9 and 16 respectively. The magnetic energy differs from one air gap to another. The changes in the magnetic energy develop reluctance torque. Furthermore, since the rotor 1 is provided with the permanent magnets 6 and 13, torque is also developed by a magnetic attractive force and magnetic repulsive force between the permanent magnets 6 and 13 and magnetic poles of the stator. Consequently, the rotor 1 is rotated.

In this case, the magnetic flux acts at both ends of the stator coil of the permanent magnet embedded in the rotor 1 in the same manner, working by the same amount in such a direction that an action of the leakage flux of the permanent magnet is canceled at both ends, thereby denying the action of the leakage flux, whereupon axial oscillation is restrained.

In the foregoing embodiment, the magnetic concave and convex portions 8 and 9 of the block 3 are shifted by the predetermined angle $\Delta\theta$ in the direction opposite the rotation direction X (clockwise) on the basis of the center line Lo. Further, the magnetic concave and convex portions 15 and 16 of the block 4 are also shifted by the predetermined angle $\Delta\theta$ in the rotation direction X (counterclockwise) on the basis of the center line Lo. As a result, the linear loci of the center lines Lb, Lc, Lc and Lb of the respective blocks 3, 4, 4 and 3 are zigzagged and accordingly, the rotor 1 can achieve the effects similar to those of skew in the rotors for squirrel-cage induction motors. Consequently, torque ripple, oscillation, vibration and noise can be reduced in the permanent-magnet reluctance type rotating machine, and a peak value of back electromotive force can be reduced in the stator winding.

Additionally, an amount of shift is set so as to be ±0 between the center lines Lb and the center lines Lc in the rotor core 2. Consequently, magnetic obstacle can be prevented although the rotor 1 can achieve the effects similar to those of skew in the rotors for squirrel-cage induction motors.

Figure 6:
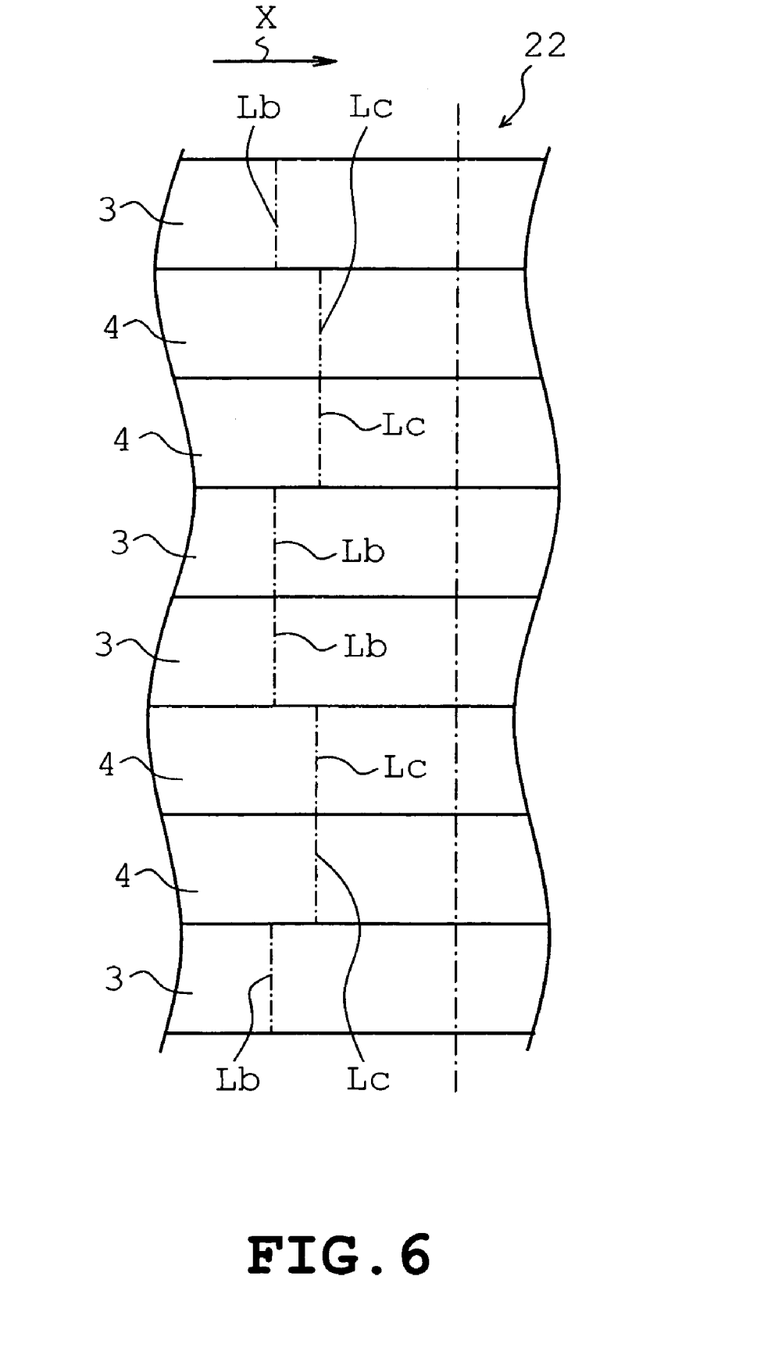
FIG. 6 is a view similar to FIG. 1, showing the rotor in accordance with another embodiment of the invention.

FIG. 6 illustrates another embodiment of the invention. Describing the difference of the second embodiment from the first embodiment (FIG. 1), the rotor core 22 employed instead of the rotor core 2 includes further four blocks 3, 4, 4 and 3 stacked in this order. The other construction of the rotor of the second embodiment is the same as that of the first embodiment.

The second embodiment is suitable particularly for large-sized rotors and can achieve the same effects as those of the first embodiment.

The thickness of each of the blocks 3 and 4 in the second embodiment may be a half of that in the first embodiment. In short, the core material of two blocks 4 and 4 adjacent to each other in at least four blocks 3, 4, 4 and 3 are formed so that the magnetic concave and convex portions 15 and 16 are shifted by a predetermined angle in one of the rotation direction and a direction opposed to the rotation direction relative to a center line passing the key. The core material of the blocks 3 and 3 located at both ends of the blocks 4 and 4 are formed so that the magnetic concave and convex portions 8 and 9 are shifted by a predetermined angle in the other of the rotation direction and the direction opposed to the rotation direction relative to the center line passing the key.

The permanent magnets are provided on the rotor core in each of the foregoing embodiments. However, the permanent magnets may or may not be provided on the rotor core.

In each of the foregoing embodiments, the central blocks 4 and 4 may be supposed to be a single block such that three blocks constitute the rotor core. Alternatively, a single block 4 and two blocks 3 located at both ends of the block 4 respectively may constitute the rotor core.

Further, the generally triangular cavities are formed in the rotor core so as to compose the concave and convex portions in each of the foregoing embodiments. However, the cavities may be circular, elliptic, rectangular or rhombic. Additionally, the rotor core may have mechanical concave and convex portions formed therein so that the magnetic concave and convex portions are formed.

The number of poles of the rotor should not be limited to eight. The same effect can be achieved even when the number of poles is any other number. Furthermore, the number of slots of the stator may be set at any suitable number. Additionally, the number of blocks of the rotor should not be limited to two and four. Five or more blocks may be provided by stacking the silicon steel sheets having the magnetic concave and convex portions shifted. In this case, an amount of shift of the center line is required to be ±0.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A rotor for a reluctance type rotating machine comprising:

a rotor core formed by stacking a number of annular core materials each of which includes a pair of permanent magnets embedded in a portion corresponding to each magnetic concave portion, and a cavity defined between the paired permanent magnets so that magnetic concave and convex portions are alternately formed on an outer circumference thereof and a central through hole, the rotor core having a plurality of keys axially extending on an inner circumference thereof, the rotor core being divided into a plurality of blocks having the same shape, the annular core materials of each block being stacked so that an angle made by a pole center line passing through a center of each cavity and a center of rotation and a key center line passing through a circumferential center of at least one key and the center of rotation is set at a value obtained by adding 180/n, where n is a number of poles, and a predetermined angle $\Delta\theta$ determining a skew angle; and a rotational shaft having a plurality of key grooves formed in an outer circumference thereof and engaging the keys of the rotor core respectively, the shaft being inserted through the central hole of the rotor core, whereby at least three of the blocks are axially stacked so that a skew angle is made between each one of said at least three blocks and another of said at least three blocks according to the predetermined angle $\Delta\theta$.

2. A rotor according to claim 1, wherein each block includes the magnetic concave portions each of which is provided with a pair of magnet insertion holes which are opposed to each other so that a distance therebetween is gradually increased as the insertion holes near the outer circumference of the rotor, each cavity is positioned between the paired magnet insertion holes, and permanent magnets are inserted and fixed in the insertion holes respectively.

* * * * *

UNITED STATES PATENT AND TRADEMARK OFFICE
CERTIFICATE OF CORRECTION

PATENT NO. : 7,057,322 B2
APPLICATION NO. : 10/897009
DATED : June 6, 2006
INVENTOR(S) : Takashi Araki et al.

It is certified that error appears in the above-identified patent and that said Letters Patent is hereby corrected as shown below:

On the Title Page, Item (73)
"Assignees" should read: --KABUSHIKI KAISHA TOSHIBA, Tokyo (JP); AISIN AW CO., LTD., Anjo-shi (JP); TOSHIBA INDUSTRIAL PRODUCTS MANUFACTURING CORP., Mie-gun (JP)--

Signed and Sealed this

Eighteenth Day of September, 2007

JON W. DUDAS
*Director of the United States Patent and Trademark Office*